United States Patent [19]

Hartmann

[11] 3,987,502

[45] Oct. 26, 1976

[54] PLUMBING FIXTURE FOR PENAL INSTITUTION

[76] Inventor: Jack P. Hartmann, 414 Darby Road, Havertown, Pa. 19083

[22] Filed: Jan. 7, 1976

[21] Appl. No.: 647,213

[52] U.S. Cl. .................................... 4/75; 4/100; 4/DIG. 3; 4/DIG. 15; 137/392
[51] Int. Cl.² .................. E03D 11/02; E03D 11/18
[58] Field of Search ............ 4/1, 10, 75, 67 A, 57 P, 4/67 R, 57 R, 249, 100, DIG. 3, DIG. 15; 137/392

[56] References Cited
UNITED STATES PATENTS

| | | | |
|---|---|---|---|
| 1,815,384 | 7/1931 | Tracy | 4/75 |
| 1,820,981 | 9/1931 | Fever | 137/392 |
| 2,707,482 | 5/1955 | Carter | 137/392 |
| 2,860,348 | 11/1958 | McClenahan | 4/DIG. 15 |
| 2,988,751 | 6/1961 | Rutherford | 4/75 X |
| 3,437,107 | 4/1969 | Waseleski, Jr. | 137/392 |
| 3,498,085 | 3/1970 | Czech | 137/392 X |
| 3,908,204 | 9/1975 | Hopkins | 4/100 |
| 3,928,874 | 12/1975 | Albertson | 4/1 |

*Primary Examiner*—Henry K. Artis

[57] ABSTRACT

A plumbing fixture is provided with means for preventing flooding by obstructing the waste outlet thereof, such means being an overflow chamber along the edge of a bowl or basin, further provided with an electrical probe within the overflow chamber to complete an electrical circuit between the probe and the basin when the water level bridges the gap therebetween, thereby actuating a normally open solenoid valve to closed position for shutting off the supply of running water to the basin. The invention is applicable to a combination lavatory and water closet fixture for preventing flooding from either the bowl of the lavatory, or the bowl of the water closet, or both by providing such means for both bowls.

10 Claims, 4 Drawing Figures

PLUMBING FIXTURE FOR PENAL INSTITUTION

BACKGROUND OF THE INVENTION

This invention relates to plumbing fixtures for penal institutions and more particularly to means for preventing flooding and consequent damage from obstruction of the waste outlet thereof.

Penal institutions provide cells for the inmates or prisoners, each cell usually being equipped with a plumbing fixture that is a combination water closet and lavatory, preferably wall mounted. The lavatory usually consists of a fixed bowl or basin with a faucet providing running water, plus a drain pipe for disposal of waste, all of which may be used by the inmate for washing the hands and face. The water closet or toilet of the combination unit is a fixture consisting typically of a water-flushed bowl with a toilet seat that is used for urination and defecation.

One of the problems of providing the combination unit described above for the convenience of the inmates is that one or more inmates may attempt to cause damage to the institution by flooding it by overflowing one or both of the bowls of the combination unit. This is frequently accomplished by obstructing the waste outlet or drain pipe and adjusting the valve controlling the flow of water into the unit for continuous flow, with the object of admitting a greater volume of water than can be drained out via the waste outlet. Accordingly, it is an object of this invention to provide a combination unit of the type set forth which will defeat attempts to cause overflowing and consequent damage to the institution.

Although it is known from prior U.S. Pat. Nos. 1,815,384 and 2,991,481 to provide plumbing fixtures with overflow systems, these have not resulted in commercially available fixtures which are entirely satisfactory.

SUMMARY OF THE INVENTION

According to the present invention, a plumbing fixture is provided having a fixed bowl or basin which has means for admitting water thereto and drain means for discharging the waste therefrom, and that improvement comprising an overflow chamber along the inside rim of the bowl and in communication therewith, further provided with an electrical sensing probe extending into said overflow chamber but in spaced relationship with the rim. When the liquid level in the bowl rises to a level where the liquid enters the overflow chamber and bridges the gap between the probe and basin, assuming the basin is electrically conductive, an electrical circuit will be completed therebetween by the water or liquid. A control circuit extends, not only from ground to the conductive basin, but also from the electrical sensing probe through solenoid valves to a source of low voltage current. Thus, when the circuit is complete as aforesaid during an approaching overflow condition, the solenoid valve will be energized and the normally open valve will be moved to closed position. In an arrangement where the solenoid valve controls the supply of pressurized water to the faucet which supplies running water to the bowl, the supply of pressurized water will be shut off and the basin will not overflow and the institution will not be damaged. With an overflow chamber provided for both the lavatory bowl and the toilet bowl, and with an electrical sensing probe in each overflow chamber, it is optional whether the electrical sensing probe will be connected to a master solenoid valve controlling the supply of water to both the flushing valve for the toilet bowl and the faucet valve for the lavatory basin, or whether an electrical sensing probe should be connected to a solenoid valve to separate water lines for the separate respective valves.

DESCRIPTION OF THE PREFERRED EMBODIMENT

Figure 2:
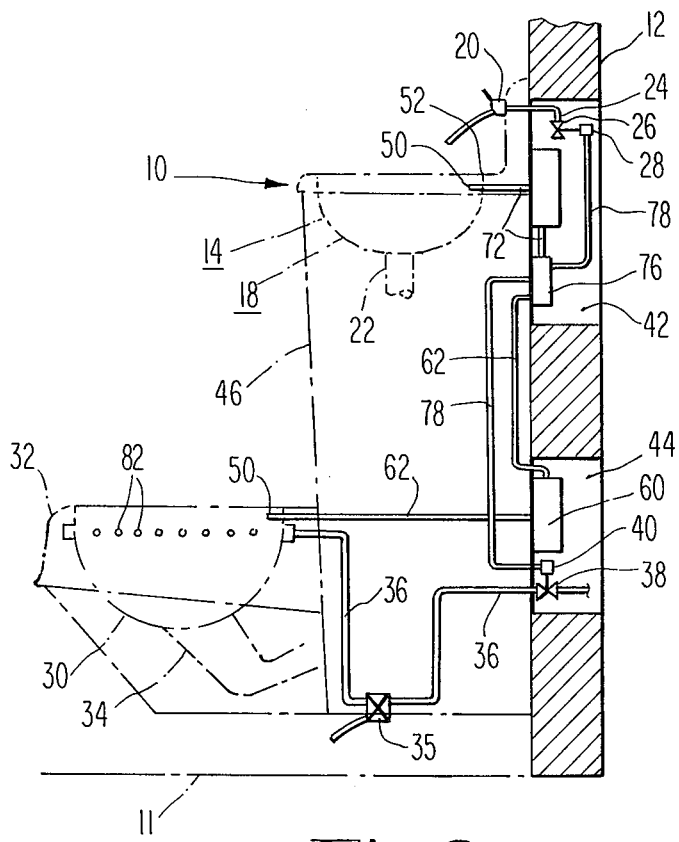
FIG. 2 is an elevational view showing diagrammatically the mounting of the combination plumbing fixture on an upright wall, with the wall being shown in vertical section.
Figure 1:
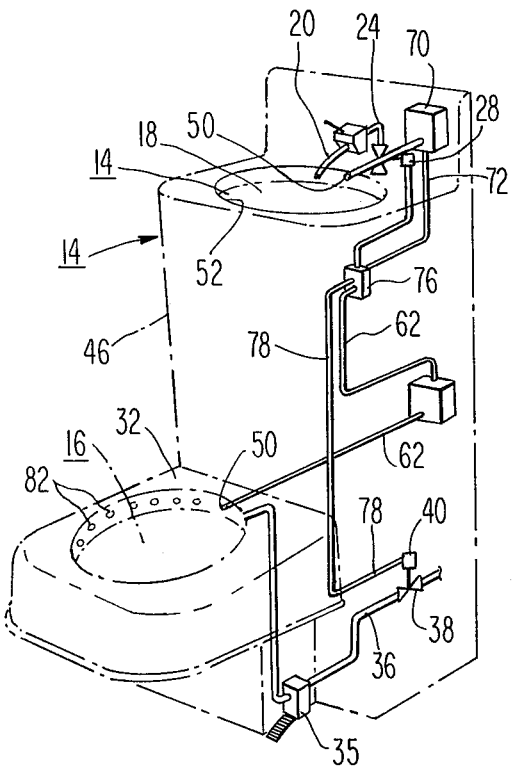
FIG. 1 is a partly isometric, partly diagrammatic view of a combination plumbing fixture made according to the present invention.

As shown in the drawings, the combination water closet and lavatory fixture is designated by the numeral 10 in FIGS. 1 and 2. As best seen in FIG. 2, the fixture 10 is preferably mounted off the floor 11 on an upright wall 12 serving as one of the walls of a cell for inmates of a penal institution. The fixture 10 comprises a lavatory 14 and a water closet 16. The term toilet is also applied to the water closet 16.

The lavatory 14 comprises a fixed bowl or basin 18 adapted to receive running water from a faucet 20, and being provided with a drain pipe 22 for discharging waste therefrom. The faucet 20 includes a valve (not shown in detail) at the end of a supply line 24 for pressurized water. A suitable, normally open, solenoid valve 26 is installed in the supply line 24 upstream of the faucet 20. The solenoid portion of the solenoid valve 26 is designated by the numeral 28.

The water closet or toilet 16 consists typically of a water-flushed bowl 30 supporting an apertured seat 32, constructed in the usual way to provide an upwardly extending opening from the bowl 30 through the seat 32. Although not shown in detail, the bowl 30 is provided with the usual downwardly extending waste pipe 34 for discharging from the bowl 30. The waste pipe 34 and the drain pipe 22 lead in the usual manner to the sewage line (not shown). Flushing water is introduced to the bowl 30 from a supply line 36, there being a normally open solenoid valve 38 installed in such supply line. The solenoid valve 38 includes solenoid 40 which is electrically operable when energized to close the valve 38. The supply line preferably leads to a plurality of discharge openings (not shown) leading into the bowl and extending along the upper, inner portion or rim of the bowl, such constructions being well known in the art. The well known provision of a manually operable flushing valve 35 connected in the line 36 between the solenoid valve 38 and the bowl 30.

As noted previously, plumbing fixtures of the type just described in detail thus far are susceptible to manipulation by an inmate to create a flooding condition by blocking or obstructing either, or both, the drain pipe 22 and the waste pipe 34 while admitting water to either, or both, the bowl 18 and the bowl 30, whichever is obstructed.

Before proceeding to a description of the present invention in detail, it is noted here that the fixture 10 is constructed and arranged specially for penal use. For example, the fixture 10 is mounted on the wall 12 having utility compartments 42 and 44. Utility compartment 42 houses the supply line 24 and the solenoid valve 26, as well as associated electrical circuitry to be described hereinafter. Likewise, the lower utility compartment 44 houses the supply line 36, the solenoid valve 38 and the associated electrical circuitry which will be described. The compartments 42, 44 are accessible from the side of the wall 12 outside the cell in which the fixture 10 is installed. However, the compartments 42, 44 are blocked, and therefore not accessible to inmates, because the fixture 10 is mounted in such a way as to cover them. The combination fixture 10 has an outer shell 46 of stainless steel or other durable sheet metal which is also strong enough to resist damage by inmates. The shell 46 houses both the lavatory 14 and the water closet 16. In addition, it is shaped at the water closet 16 to provide the seat 32. The bowl 30 is also made of electrically conductive sheet metal, preferably stainless steel, and it is grounded electrically by means of its physical connection to the supply line 36. Likewise, the basin 18 is preferably made of a strong, durable sheet metal such as stainless steel, housed within the shell 46, and grounded electrically by connection to ground via an electrically conductive metal drain pipe 22. As seen in the drawings, the fixture 10 is a well fortified, strong, durable plumbing unit which itself is highly resistant to abuse, but it can be used as an instrument for damage unless it is provided with means for the prevention of overflow in accordance with the objectives of the present invention.

In accordance with this invention, an electrical sensing probe 50 is provided for both the lavatory 14 and water closet 16, in each case constructed along similar lines and therefore it will be described in detail with reference to the water closet 16. However, the overflow prevention feature applied to the water closet 16 is structurally representative of the overflow feature provided for the lavatory 14 and, therefore, for the sake of brevity, only one overflow prevention device will be described in detail. Like reference numerals will designate correspondingly similar parts appearing in the drawing.

Figure 3A:
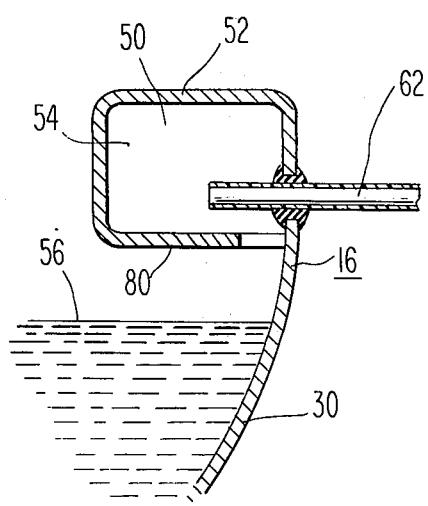
FIG. 3A is a vertical, sectional view taken through the bowl of the water closet of the fixture of FIGS. 1 and 2, showing a water level below the overflow chamber, with water supply omitted.
Figure 3B:
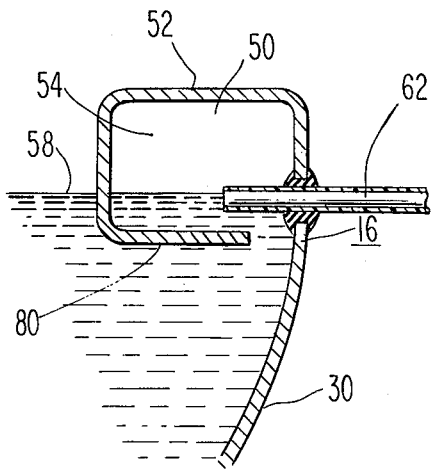
FIG. 3B is a view similar to FIG. 3A, but showing the water level to the level of the overflow chamber.

At the upper end of the bowl 30 a rim 52 is formed by bending the upper edge inwardly, downwardly and outwardly to provide the cross-sectional shape shown in FIGS. 3A and 3B thereby defining an overflow chamber 54, as shown. The overflow chamber 54 extends 360°, that is, about the entire rim of the bowl 30, although the invention can obviously be practiced by interrupting the overflow chamber. Preferably, the probe 50 extends for a short distance into the overflow chamber 54, as suitable to obtain proper sensing, in order that it will be immediately responsive to an overflow condition at any point in the chamber 54. Ordinarily, the normal water level designated by the numeral 56 in FIG. 3A will rise in the bowl 30 in the event of an overflow condition to approximately the overflow water level condition designated by the numeral 58 in FIG. 3B.

In the overflow state, such as might be caused by stuffing clothing or rags either in the waste pipe 34 or the drain pipe 22, the water at level 58 will bridge the gap between the probe 50 and the side wall of the bowl 30 as shown in FIG. 3B. This bridging between the conducting members 50 and 30 is equivalent to the closing of a switch between ground, to which the bowl 30 is connected, and a terminal box 60, to which the probe 50 is connected by means of an electrical line 62. The probe 50, which is associated with the lavatory 14, is electrically connected to its terminal box 70 by means of an electrical line 72.

Electrical line 62 is extended from terminal box 60 to junction box 76 and there connected in parallel with electrical line 72 from terminal box 70. Junction box 76 is supplied with low voltage electrical power, preferably 12 volts DC, in order to energize the circuitry when water level 58 of FIG. 3B exists, whereby current is passed via conductors 78 from junction box 76 to the solenoids 28 and 40. The energization of solenoids 28 and 40 closes the solenoid valves 26 and 38, thereby shutting off the supply of pressurized water through supply lines 24 and 36 and preventing an overflow condition.

Various alternative electrical arrangements will appear to those skilled in this art.

Preferably, running water admitted to the bowl 30 is admitted through holes 82 or other outlet passageways disposed below the inwardly turned portion 80 of the rim 52 so as to avoid a false overflow reading by the apparatus.

What is claimed is:

1. A plumbing fixture comprising: a bowl for liquid having a rim including structure defining an overflow chamber extending along the upper periphery of said bowl, said overflow chamber opening into said bowl and said structure providing an electrical ground, means including a supply line and a normally open solenoid valve in said supply line for supplying water to said bowl, a drain for said bowl, a sensing probe including a conductor extending through said overflow chamber in spaced relation to said structure providing said electrical ground, and means responsive to water completing an electrical circuit between said electrical ground and said sensing probe for energizing said solenoid valve and closing said supply line, whereby an overflow of water from said bowl into said overflow chamber such as may be caused by an obstruction in said drain will effect a termination of water supply to said bowl and thereby prevent water from overflowing the rim of said bowl.

2. A plumbing fixture according to claim 1 wherein said bowl is made of electrically conductive material, and said rim forms said overflow chamber and is electrically grounded to provide the electrical ground in said overflow chamber.

3. A plumbing fixture according to claim 1 wherein said bowl is a lavatory, further including a faucet at the end of said supply line for providing running water for said bowl.

4. A plumbing fixture according to claim 1 wherein said bowl is included in the water closet and said supply line is further provided with flushing means at the end thereof.

5. A plumbing fixture according to claim 1 further including an outlet for said means supplying water to said bowl positioned below said sensing probe and said overflow chamber.

6. A plumbing fixture according to claim 1 wherein the means responsive to water completing the electrical circuit includes a low voltage electrical supply connected between said sensing probe and said solenoid valve for energizing said solenoid of said valve.

7. A plumbing fixture according to claim 1 mounted on an upright wall structure having a utility compartment formed therein, with said fixture being mounted on said wall, with said supply line and said solenoid valve being disposed in said utility compartment, and further provided with a metal shell for housing said plumbing fixture and covering said utility compartment.

8. A plumbing fixture according to claim 1 comprising a plurality of said bowls, each having a sensing probe in the respective overflow chambers of said bowls.

9. A plumbing fixture according to claim 8 wherein one of said bowls is a lavatory bowl and the other of said bowls is a toilet bowl, both of said bowls being disposed within a metal housing.

10. A plumbing fixture according to claim 9 wherein each bowl is provided with an overflow chamber and an associated sensing probe, said probes being connected in parallel to said solenoid valve whereby said water supply line is closed in the event either one of said bowls overflows.

* * * * *